US008520889B2

(12) United States Patent
Navon et al.

(10) Patent No.: US 8,520,889 B2
(45) Date of Patent: Aug. 27, 2013

(54) AUTOMATED GENERATION OF FORM DEFINITIONS FROM HARD-COPY FORMS

(75) Inventors: Yaakov Navon, Ein Vered (IL); Ari Shotland, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 610 days.

(21) Appl. No.: 12/515,050

(22) PCT Filed: Nov. 7, 2007

(86) PCT No.: PCT/EP2007/061965
§ 371 (c)(1),
(2), (4) Date: Jan. 11, 2010

(87) PCT Pub. No.: WO2008/058871
PCT Pub. Date: May 22, 2008

(65) Prior Publication Data
US 2010/0128922 A1    May 27, 2010

(30) Foreign Application Priority Data
Nov. 16, 2006  (GB) ................................. 0622863.9

(51) Int. Cl.
*G06K 9/00*    (2006.01)
(52) U.S. Cl.
USPC ....................................................... 382/100
(58) Field of Classification Search
USPC . 382/100, 137, 181, 229–289; 700/106–109;
380/200–242; 358/3.28, 426.01–426.16;
348/384.1–440.1; 375/122, 240.01–240.29
See application file for complete search history.

(56) References Cited

U.S. PATENT DOCUMENTS

| 5,228,100 A | 7/1993 | Takeda |
| 5,625,465 A | 4/1997 | Lech |
| 6,801,658 B2 | 10/2004 | Morita |
| 2002/0106128 A1 | 8/2002 | Zlotnick |
| 2005/0210048 A1 | 9/2005 | Beres |
| 2006/0271224 A1* | 11/2006 | Lopez et al. .................. 700/106 |

FOREIGN PATENT DOCUMENTS

| EP | 0 407937 | 1/1991 |
| EP | 00407935 A2 | 1/1991 |
| JP | 05-216932 | 8/1993 |

(Continued)

OTHER PUBLICATIONS

J.L. Chen, "Field data extraction for form document processing using a gravitation-based algorithm", Pattern Recognition, v34, n9, Sep. 2001, p. 1741-1750.

(Continued)

*Primary Examiner* — Atiba O Fitzpatrick
(74) *Attorney, Agent, or Firm* — Derek S. Jennings; Patent Mining Works, LLC

(57) ABSTRACT

A computer-implemented method for form generation includes capturing an image of a hard-copy form, and automatically processing the image to identify form fields in the image and text characters associated with each of the form fields. Geometrical coordinates of the form fields that define respective filling areas for entry of information into the fields are determined. Optical character recognition (OCR) is applied to the text characters in order to identify form field names. Associations are determined between the form field names and object names of corresponding data objects. The geometrical coordinates of the filling areas of the form fields are combined with the object names of the data objects corresponding to the form fields to generate a form definition.

2 Claims, 4 Drawing Sheets

(56) References Cited

FOREIGN PATENT DOCUMENTS

| WO | WO 9613009 | 5/1996 |
|----|------------|--------|
| WO | WO 9847098 | 10/1998 |
| WO | WO 03096219 A1 | 11/2003 |

OTHER PUBLICATIONS

Z.H. Zhao, "A study on printed form processing and reconstruction", Proceedings of 2002 International Conference on Machine Learning and Cybernetics, v4, 2002, p. 1730-1732.

J. Higashino, "Knowledge-based segmentation method for document understanding", Proceedings of International Conference on Pattern Recognition, 1986, p. 745-748.

J. Mao, "A model-based form processing sub-system", Proceedings of 13th International Conference on Pattern Recognition, 1996, v3, pt. 3, p. 691-695.

S. D. Gowda, "Page Segmentation and Rule Based Identification Method for Technical Journal Pages".

* cited by examiner

| 5. PATIENT ADDRESS (No., Street) ~92 ~96 |||
|---|---|---|
| CITY ~92  ~96 | | STATE ~92 |
| ZIP CODE ~92 ~96 | TELEPHONE (Include Area Code) ~92 | |

| 5. PATIENT ADDRESS (No., Street) ||
|---|---|
| 123 Main St. ||
| CITY | STATE |
| New York | NY |
| ZIP CODE | TELEPHONE (Include Area Code) |
| 67676 | (212) 555-1234 |

```
8. PATIENT STATUS          112              112
108  Single  ☐      Married  ☐       Other  ☐
       108         108              108     112
     Employed ☐  Full-Time ☐      Part-Time ☐
                 Student            Student
```

8. PATIENT STATUS

Single ☐        Married ✓        Other ☐

Employed ✓      Full-Time ☐      Part-Time ☐
                Student          Student

AUTOMATED GENERATION OF FORM DEFINITIONS FROM HARD-COPY FORMS

FIELD OF THE INVENTION

The present invention relates generally to form processing systems, and particularly to methods and systems for automated generation of form definitions.

BACKGROUND OF THE INVENTION

Many organizations and enterprises use forms as part of their business processes. Various methods and systems are known in the art for automatically processing forms. For example, U.S. Pat. No. 5,228,100 describes a system for accepting input data to a form display. The system scans an image of a form document using a scanner and produces a form image. A processor recognizes character and line patterns in the form image and produces physical and logical structure data of the document. The processor automatically produces a program for inputting data to the form display, based on the logical structure data. The system includes a screen for presenting a form display defined by the physical structure data, a data input apparatus and a printer for producing a printout document based on the form display filled with the data.

SUMMARY OF THE INVENTION

There is therefore provided, in accordance with one aspect of the present invention, a computer-implemented method for form generation. The method includes automatically processing a captured image of a hard-copy form to identify form fields in the image and text characters associated with each of the form fields. Geometrical coordinates of the form fields that define respective filling areas for entry of information into the fields are determined. Optical character recognition (OCR) is applied to the text characters in order to identify form field names. Associations are determined between the form field names and object names of corresponding data objects. The geometrical coordinates of the filling areas of the form fields are combined with the object names of the data objects corresponding to the form fields to generate a form definition.

In accordance with one embodiment of the present invention, the method further includes automatically reading values of the data objects from a data repository responsively to the determined associations in the form definition, and outputting a copy of the form in which the values have been filled into the filling areas of the form fields.

In accordance with another embodiment of the present invention, outputting the copy of the form includes at least one of printing the copy, sending the copy by fax and sending the copy by electronic mail.

In accordance with yet another embodiment of the present invention the data repository includes a database of an enterprise resource planning (ERP) system.

In accordance with one embodiment of the present invention, the hard-copy form is produced by a first ERP system, and the form definition is part of a second ERP system that replaces the first ERP system.

In accordance with another embodiment of the present invention, automatically processing the image includes extracting a layout-related feature of the hard-copy form and including the feature in the form definition.

In accordance with this embodiment of the present invention, the layout-related feature includes at least one of a logo, a title, a frame, a corner, a shading pattern and a line.

In accordance with one embodiment of the present invention, the filling areas include at least one of textual filling areas and check boxes.

In accordance with another embodiment of the present invention, determining the associations includes automatically matching the form field names with the object names of the data objects.

In accordance with a second aspect of the present the present invention there is provided a form generation system. The system includes a processor, which is arranged to automatically process an image captured from a hard-copy form to identify form fields in the image and text characters associated with each of the form fields, to determine geometrical coordinates of the form fields that define respective filling areas for entry of information into the form fields, to apply optical character recognition (OCR) to the text characters in order to identify form field names, to determine associations between the form field names and object names of corresponding data objects, and to combine the geometrical coordinates of the filling areas of the form fields with the object names of the data objects corresponding to the form fields to generate a form definition. The form generation system may also include an image capture device arranged to capture an image of a hard-copy form.

In accordance with a third aspect of the present invention there is provided a computer software product for form generation. The product includes a computer-readable medium, in which program instructions are stored, which instructions, when read by a computer, cause the computer to accept a captured image of a hard-copy form, to automatically process the image to identify form fields in the image and text characters associated with each of the form fields, to determine geometrical coordinates of the form fields that define respective filling areas for entry of information into the form fields, to apply optical character recognition (OCR) to the text characters in order to identify form field names, to determine associations between the form field names and object names of corresponding data objects, and to combine the geometrical coordinates of the filling areas of the form fields with the object names of the data objects corresponding to the form fields to generate a form definition.

The present invention will be more fully understood from the following detailed description of the embodiments thereof, taken together with the drawings in which:

BRIEF DESCRIPTION OF THE DRAWINGS

FIG. 4A is a diagram showing an excerpt of a hard-copy form, in accordance with an embodiment of the present invention;

FIG. 4B is a diagram showing an excerpt of a printed filled-in form, in accordance with an embodiment of the present invention;

FIG. 5A is a diagram showing another excerpt of a hard-copy form, in accordance with an embodiment of the present invention; and FIG. 5B is a diagram showing another excerpt of a printed filled-in form, in accordance with an embodiment of the present invention.

DETAILED DESCRIPTION OF EMBODIMENTS

Embodiments of the present invention provide methods and systems for automated generation of form definitions based on existing hard-copy forms. These methods and systems can be used, for example, when an organization switches from one enterprise resource planning (ERP) system to another, or in other data processing applications, which are described further below.

When changing ERP systems, the forms used by the organization need to be defined in the new ERP system. Manual definition of the form's content and layout, sometimes aided by a graphical editor, is typically a tedious, time-consuming, error-prone process, particularly when the organization uses a large number of complex forms. It is therefore desirable to automate the form definition process in order to minimize human involvement and reduce the definition time.

In most cases, hard-copy forms of the previous ERP system are available. Embodiments of the present invention use the available hard-copy forms to define equivalent forms, which may be used in the new ERP system.

In some embodiments, the existing hard-copy form is first scanned to produce a computer-readable image. A form generator analyzes the layout of the image and identifies the fields of the form. For each form field, the field name is extracted, typically using an optical character recognition (OCR) process. Additionally, the geometrical coordinates of the field's filling area, i.e., the blank area in which information is to be entered, are identified. In some embodiments, layout-related features of the form, such as logos, frames and other objects, are also extracted from the image.

The form generator then links the identified form fields with appropriate data objects, such as with fields in an ERP database. For example, the form generator may attempt to find object names in the database that match the form field names extracted from the image. Additionally or alternatively, a user may perform the association between form fields and data objects manually. The user may verify the results of the automatic association and/or be asked to perform the association manually when the form generator fails to locate a matching object name. At the end of the association process, each form field is associated with a respective data object in the ERP database.

The form generator produces a form definition comprising the identified form field names and filling area locations, as well as the associations found between each form field and the corresponding data object. The form definition may also comprise layout-related features of the form. The ERP system can subsequently fill in and print out forms by retrieving data from the appropriate data fields of the database, in accordance with the form definition.

Figure 1:
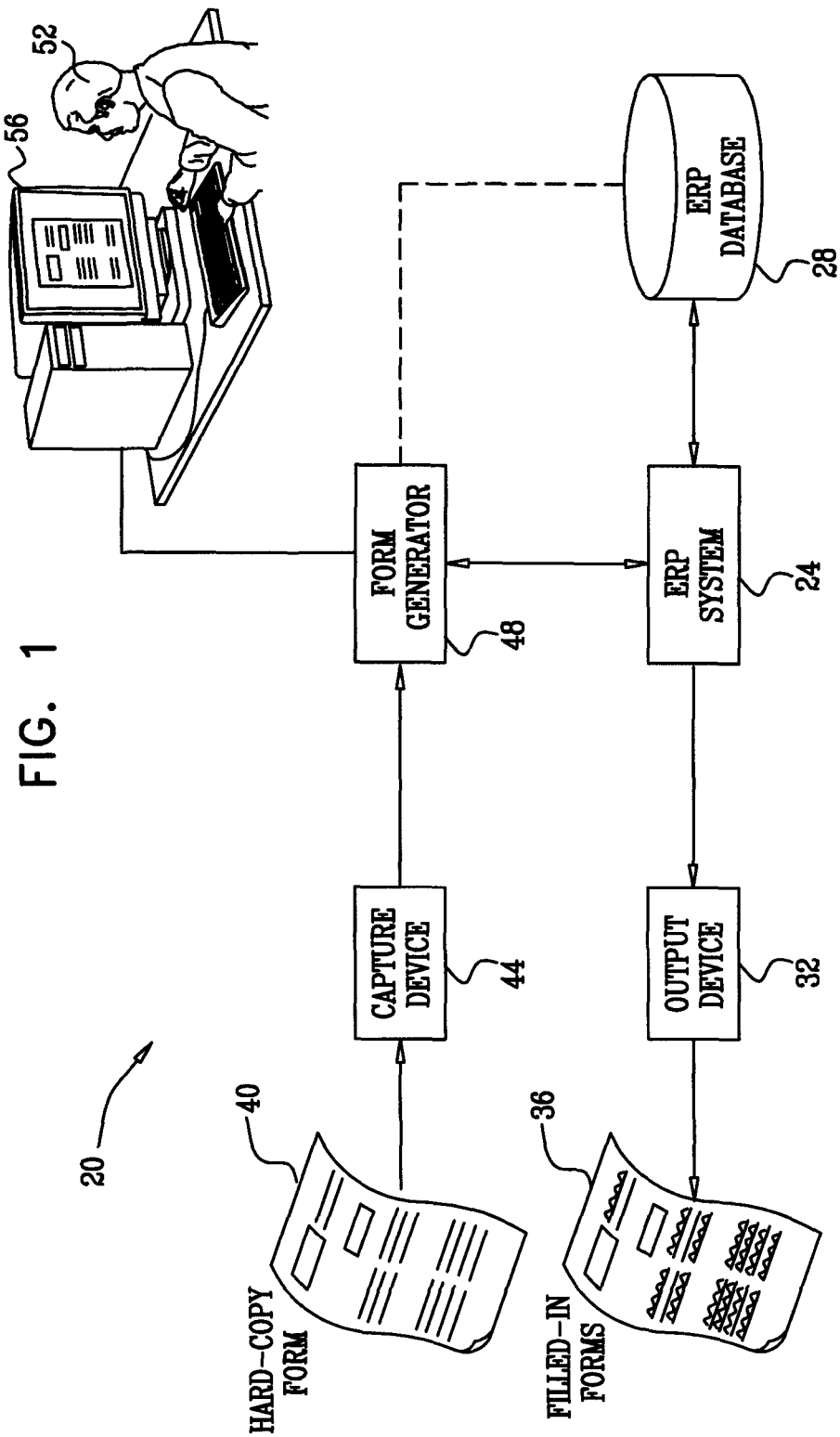
FIG. 1 is a block diagram that schematically illustrates a form processing system, in accordance with an embodiment of the present invention.

FIG. 1 is a block diagram that schematically illustrates a form processing system 20, in accordance with an embodiment of the present invention. System 20 comprises an enterprise resource planning (ERP) system 24, which, inter alia, processes information and prints out filled-in forms, i.e., forms that have been filled in with the information. The forms printed by ERP system 24 may comprise any suitable filled-in forms, such as invoices, receipts, orders, quotes and reports.

Although the description that follows refers to the processing of a single type of form, system 20 typically supports multiple form types.

The information that may be filled into the forms is stored in a data repository, such as an ERP database 28. Each form to be filled in and printed may correspond, for example, to a record holding multiple data objects in database 28, or to a combination of data objects held in different records. The data objects contain the information that will appear in the different fields of the form. Each data object in database 28 has an object name, which may additionally comprise a brief textual description and/or one or more keywords that describe the data field.

The ERP system produces and prints forms in accordance with a form definition or template. In some embodiments, the form definition specifies both the physical layout of the form and its content. The form definition specifies the different form fields. The definition typically specifies layout-related properties of each form field, such as the location coordinates of the field title and filling area on the form and/or the fonts to be used for printing the field title and contents. The definition may also specify graphical objects related to the field, such as frames, corners, shading patterns and lines, as well as properties of the entire form, such as a logo and a form identifier. In particular, the form definition specifies associations or links that link form fields to respective data objects in ERP database 28, which hold the information to be filled in the form fields.

Thus, in order to print out a filled-in form, ERP system 24 retrieves the information to be filled-in by querying the appropriate data objects in database 28, as specified by the associations in the form definition. The ERP system constructs the filled-in form in accordance with the layout defined in the form definition, and in particular inserts the retrieved database information into the appropriate filling areas of the form fields.

The system prints out filled-in forms 36 using an output device 32, such as a printer. Alternatively, the system may produce the filled-in form as an image file and send it to its destination using e-mail. Further alternatively, output device 32 may comprise a fax.

The form definition is derived from an existing hard-copy form 40. Form 40 is converted to a computer-readable image, referred to as a form image, by a capture device 44. Capture device 44 may comprise a scanner, a fax, or any other suitable device for converting a hard-copy form into a computer-readable image.

The form image is processed by a form generator 48. The form generator processes the form image and interacts with database 28, and possibly with a user 52 via a user workstation 56, to produce the form definition. The form definition is provided to ERP system 24, which uses it to print out filled-in forms.

Typically, form generator 48 comprises a general-purpose computer, which is programmed in software to carry out the functions described herein. The software may be downloaded to the computer in electronic form, over a network, for example, or it may alternatively be supplied to the computer on tangible media, such as CD-ROM. In some embodiments, the form generator is implemented as a software process sharing the same computing platform with ERP system 24. Alternatively, form generator 48 and ERP system 24 may use separate computing platforms.

Figure 2:
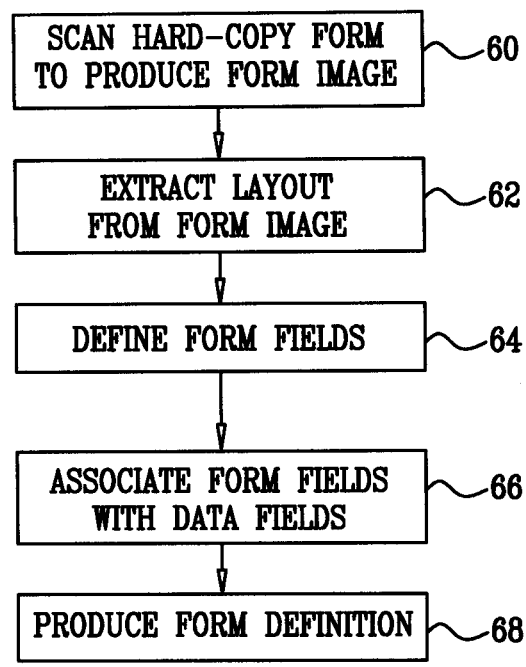
FIG. 2 is a flow chart that schematically illustrates a method for generation of a form definition from a hard-copy form, in accordance with an embodiment of the present invention.

FIG. 2 is a flow chart that schematically illustrates a method for automated generation of a form definition, in accordance with an embodiment of the present invention. The method begins with capture device 44 converting hard-copy form 40 into a computer-readable form image, at a capturing step 60.

Form generator 48 analyzes the layout of the form image, at a layout analysis step 62. The form generator extracts the different layout-related features of the form, such as logos, titles, frames, corners and lines. Additionally, the form generator identifies textual areas, i.e., areas containing text characters, in the image and decodes the text using optical character recognition (OCR). (Although the description that follows refers to hard-copy form 40 as a form that has not been filled in, the methods and systems described herein can also be applied to hard-copy filled-in forms. For example, the OCR software can be configured to distinguish between the form field names and filled-in content.)

Form generator 48 uses the information extracted from the form image to identify the different form fields and to define their properties in the form definition, at a field definition step 64. In particular, the form generator identifies the form field name and the coordinates of the filling area of each identified form field. Filling areas may comprise, for example, blank areas for entering textual information and check boxes.

The form generator associates each form field to a respective data object in database 28, at an association step 66. In some embodiments, the form generator uses the form field names, which were extracted using OCR at step 62 above. Typically, the object names are somewhat similar to the form field names as they describe similar entities. Thus, the form generator may associate form fields to data objects by matching their names. As noted above, the object names may comprise additional text or keywords that may improve the likelihood of a successful match.

Alternatively, user 52 may associate the form fields with the data objects manually, using workstation 56. Additionally or alternatively, the user may verify the results of the automated association determined by the form generator. It should be noted that even when the user performs manual association, the form definition time is significantly reduced with respect to a fully-manual form definition process.

Form generator 48 produces a form definition, at a definition output step 68. The form definition comprises the definition of each form field. In particular, the form definition comprises the associations between form fields and data objects in database 28. The form generator provides the form definition to ERP system 24.

Figure 3:
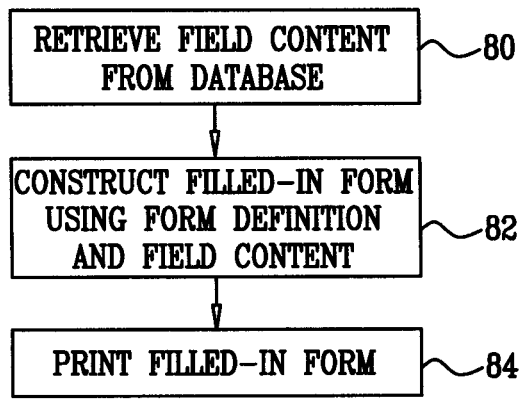
FIG. 3 is a flow chart that schematically illustrates a method for printing a filled-in form, in accordance with an embodiment of the present invention.

FIG. 3 is a flow chart that schematically illustrates a method for printing filled-in forms 36, in accordance with an embodiment of the present invention. The method begins with ERP system 24 retrieving the appropriate data objects, in accordance with the associations specified in the form definition, at a database querying step 80.

The ERP system constructs the filled-in form using the retrieved information, at a form construction step 82. The ERP system lays out the form in accordance with the layout-related field properties specified in the form definition. The system enters the information retrieved from the appropriate data object into the filling area of each form field. The ERP system then prints the filled-in form using output device 32, at an output step 84.

FIG. 4A is a diagram showing an excerpt 88 of a hard-copy form, in accordance with an embodiment of the present invention. In the present example, the excerpt is part of a health insurance claim form. The excerpt comprises five form fields for entering the patient's street and house number, city, state, zip code and telephone number.

When analyzing excerpt 88, form generator 48 identifies the five fields. In each field, the form generator identifies a text area 92 containing the form field name, and a filling area 96. The form generator extracts the text in text areas 92 using OCR, and determines the coordinates of filling areas 96. The form generator produces the following form field names and coordinates:

| Form field name | Filling area coordinates |
| --- | --- |
| Patient_Address_NoStreet | 87, 429, 615, 465 |
| Patient_Address_City | 87, 516, 544, 548 |
| Patient_Address_State | 555, 516, 615, 548 |
| Patient_Address_Zip_Code | 87, 516, 320, 612 |
| Patient_Address_Telephone | 331, 516, 615, 612 |

In the present example, a record of a particular patient in the ERP database comprises the following data objects and object names:

| ID | NoStreet | City | State | Zip_code | Telephone |
| --- | --- | --- | --- | --- | --- |
| 29875 | 123 Main St. | New York | NY | 67676 | (212) 555-1234 |

Note that the form field names and object names are not identical. Nevertheless, the form generator may associate the "Patient_Address_NoStreet" form field name with the "NoStreet" object name since the string "NoStreet" appears in both names. Similar associations may be determined for the other fields.

FIG. 4B is a diagram showing an excerpt 100 of a printed filled-in form, in accordance with an embodiment of the present invention. The filled-in form is produced based on the hard-copy form of FIG. 4A, using the methods described above. In order to produce excerpt 100, ERP system 24 retrieves the desired patient record from database 28 and lays out the form in accordance with the form definition. In particular, the system inserts the data items of the record into the appropriate filling areas, in accordance with the specified associations.

FIG. 5A is a diagram showing an excerpt 104 of a hard-copy form, in accordance with an embodiment of the present invention. In the present example of a field for entering the patient personal status, a single form field is regarded by the form generator as six sub-fields having textual areas 108 and filling areas 112. The filling areas in this case comprise check boxes. After analyzing the form image, form generator 48 identifies the following form field names and coordinates:

| Form field name | Filling area coordinates |
| --- | --- |
| Patient_Status_Single | 200, 100, 220, 120 |
| Patient_Status_Married | 250, 100, 270, 120 |
| Patient_Status_Other | 300, 100, 320, 120 |
| Patient_Status_Employed | 200, 170, 220, 190 |
| Patient_Status_Full_Time_Student | 250, 170, 270, 190 |
| Patient_Status_Part_Time_Student | 300, 170, 320, 190 |

FIG. 5B is a diagram showing an excerpt 112 of a printed filled-in form based on the hard-copy form of FIG. 5A above, in accordance with an embodiment of the present invention. In excerpt 112, the appropriate check boxes are checked by ERP system 24, based on the information retrieved from database 28.

Although the embodiments described herein mainly address form processing applications, the principles of the present invention can also be used for applications such as recovering lost or corrupted form definitions and customizing or redefining a form to a new layout. The methods and systems described herein can also be used for designing and/or modifying new forms. For example, a paper form can be scanned and filled with information, which is automatically extracted from an existing user profile.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A computer-implemented method for form generation, comprising:

automatically processing a captured image of a hard-copy form to identify form fields in the image and text characters associated with each of the form fields;

determining geometrical coordinates of the form fields that define respective filling areas for entry of information into the fields;

applying optical character recognition (OCR) to the text characters in order to identify form field names;

determining associations between the form field names and object names of corresponding data objects;

combining the geometrical coordinates of the filling areas of the form fields with the object names of the data objects corresponding to the form fields to generate a form definition;

automatically reading values of the data objects from a data repository responsively to the determined associations in the form definition, and outputting a copy of the form in which the values have been filled into the filling areas of the form fields; and wherein the hard-copy form is produced by a first ERP system, and wherein the form definition is part of a second ERP system that replaces the first ERP system.

2. A form generation system, comprising:

a processor, which is arranged to automatically process the captured image of a hard-copy form to identify form fields in the image and text characters associated with each of the form fields, to determine geometrical coordinates of the form fields that define respective filling areas for entry of information into the form fields, to apply optical character recognition (OCR) to the text characters in order to identify form field names, to determine associations between the form field names and object names of corresponding data objects, to combine the geometrical coordinates of the filling areas of the form fields with the object names of the data objects corresponding to the form fields to generate a form definition, and to automatically read values of the data objects from a data repository responsively to the determined associations in the form definition, and comprising an output device, which is arranged to output a copy of the form in which the values have been filled into the filling areas of the form fields, wherein the hard-copy form is produced by a first ERP system, and wherein the processor is arranged to provide the form definition to a second ERP system that replaces the first ERP system.

* * * * *